United States Patent [19]

Stradella et al.

[11] 3,937,088

[45] Feb. 10, 1976

[54] DRIVE MECHANISM FOR PRESSURE-GAGES, COMPRISING A MOLDED PLASTICS MAIN BODY WITH EMBEDDED BOURDON TUBE

[76] Inventors: Giuseppe Stradella; Umberto Stradella, both of 13 Via Roma, Recco (Genoa), Italy

[22] Filed: Feb. 21, 1974

[21] Appl. No.: 444,484

[30] Foreign Application Priority Data

| | | |
|---|---|---|
| Feb. 27, 1973 | Italy | 12479/73 |
| July 13, 1973 | Italy | 12734/73 |
| July 17, 1973 | Italy | 12737/73 |

[52] U.S. Cl. ................................. 73/418
[51] Int. Cl.² ........................... G01L 7/04
[58] Field of Search .................. 73/411–418, 73/299, 300, 431, 368.6; 264/275, 263

[56] References Cited

UNITED STATES PATENTS 3,623,373  11/1971  Kraft ................................. 73/418

*Primary Examiner*—Donald O. Woodiel

[57] ABSTRACT

A drive mechanism for pressure-gages in general, comprising a main body which can support all the members, and which is made by molding a plastic material with simultaneous embedding therein of an end of a Bourdon tubular spring, said end having fixedly inserted therein a small tube, which is also embedded in the plastics body in the same molding operation and which ensures the communication with the pressure source. The movable end of said Bourdon tube has integrally-formed thereon an eye member for connection with an S-shaped link which can actuate the indicating means of the pressure-gauge.

9 Claims, 13 Drawing Figures

DRIVE MECHANISM FOR PRESSURE-GAGES, COMPRISING A MOLDED PLASTICS MAIN BODY WITH EMBEDDED BOURDON TUBE

BACKGROUND OF THE INVENTION

This invention relates to a drive mechanism for pressure-gages, comprising a molded plastics main support body having embedded therein a Bourdon tube.

Said mechanism is particularly designed for industrial mass-production, therefore at very low cost, so that it can be advantageously applied on the widely-spread fire-extinguishers, or generally in the industrial field (including the submarine field) e.g. for skin-divers' equipment, such as depth-gages, and for measurement of ambient pressure, and the like.

According to the invention, the problem is solved by substantial improvements with respect to the conventional constructions of pressure-gages, so as to afford a considerably simpler construction and a considerably lower cost.

SUMMARY

Substantially, the drive mechanism according to the invention is characterized by the fact that its main body, which can support all the members and therefore can be housed in the gage casing, is formed by molding a plastic material and simultaneously embedding therein the Bourdon tubular spring, said body being adapted to operatively mount the other members by the aid only of an upper closure plate, with no need of screws or similar auxiliary means. Said mechanism comprises also a particular link between the Bourdon tube and the toothed sector that controls the indicating pointer, said link being made of S-shaped steel wire and mounted so as not to become disconnected even in case of shock or overturning though it has no fixing means. The invention proposes also a special, extremely simple means to calibrate a gage, and two modifications affording, still on the basis of said fundamental principle, the construction of an extremely simplified pressure-gage wherein the indicating pointer is replaced by a movable dial which is directly actuated by the Bourdon tube through the S-shaped link, and a depth-gage of the type used in skin-diving or the like, and a similar gage for measuring ambient pressure.

BRIEF DESCRIPTION OF THE DRAWING

The accompanying drawings show, as non-limitating example, a preferred embodiment according to the basic principle of the invention, and some modifications thereof. In the drawings.

DESCRIPTION OF THE PREFERRED EMBODIMENT

Figure 1:
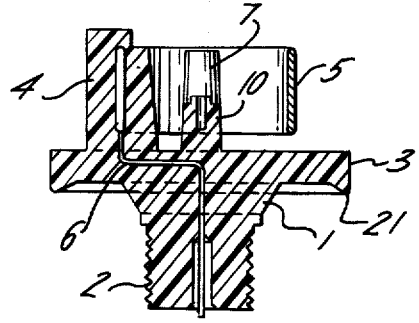
FIG. 1 is a sectional axial view on line A—A of FIG. 2 of the plastics molded support body having embedded therein a Bourdon tubular spring according to the invention.
Figure 2:
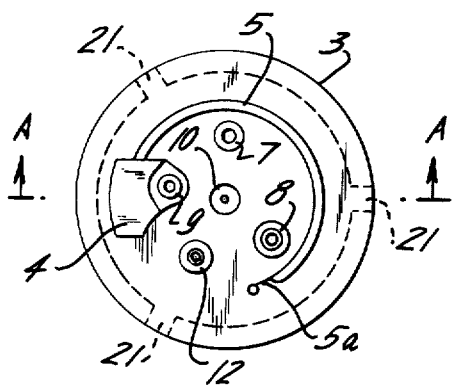
FIG. 2 is a plan view of FIG. 1.
Figure 3:
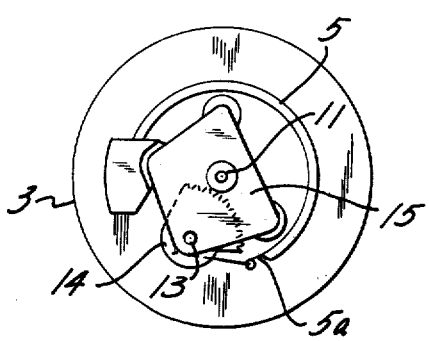
FIG. 3 is a plan view similar to FIG. 2, wherein all members of the mechanism are in an active position, and with an upper closure plate in place.
Figure 4:
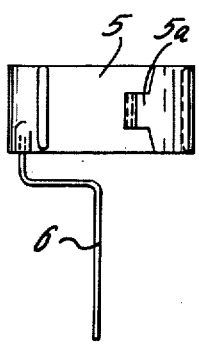
FIG. 4 in a side view of the Bourdon tube with its connection tube suitably inserted, before the molding operation.

As shown with detail on FIGS. 1, 2 and 3, the drive mechanism for pressure-gages according to the invention is mounted on a support body 1 which is molded of a suitable plastic material.

Figure 7:
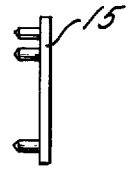
FIG. 7 is a side view of the upper closure plate.
Figure 8:
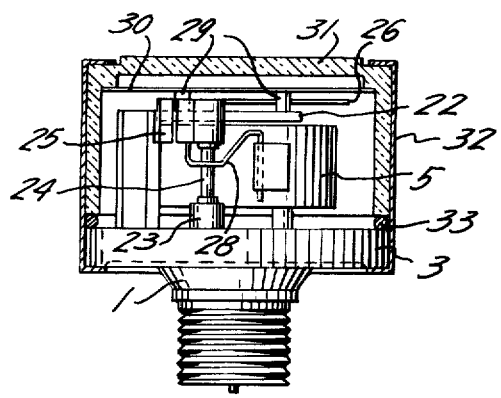
FIG. 8 is an axial sectional view of a pressure-gage according to the invention, i.e. a molded plastic support body with an embedded Bourdon tubular spring and a simplified pressure-indication system by means of a movable sector directly controlled by the tubular spring through a single link.
Figure 9:
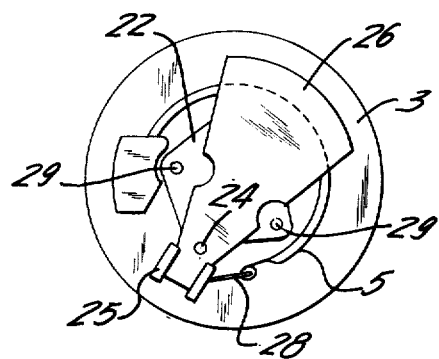
FIG. 9 is a plan view of the same gage, the outer casing and the transparent closure member being omitted.

Depending from the undersurface of said body is an axial threaded stem 2 for connection with the source of pressure, said stem having a central bore. The end of said stem 2 merges coaxially with a circular platform 3 designed to support the proper drive mechanism of the pressure-gage. On the upper surface of said platform 3, and offset with respect thereto, is formed a support member 4 which, according to one of the main characteristics of the invention, is able to receive the fixed end of the Bourdon tubular spring 5, which end is embedded in said support member 4 during the molding operation of said main support body 1. Said end of the Bourdon tube communicates with the source of pressure through an embedded tube 6, previously soldered or otherwise fixed to the Bourdon tube and emerging preferably centrally of the connection stem 2. As particularly shown in FIG. 2, said platform 3 also comprises hub-like projections 7 and 8, which are integrally molded in the same molding operation of body 1 and which are each formed with a blind axial hole. Also said support member 4 is formed with a similar axial hole 9. The platform 3, finally, comprises a central hub 10 with a hole for guiding the pointer spindle 11, and an offset hub 12 with a hole for guiding a spindle 13 carrying the toothed sector 14 that, as usual, meshes with a pinion which is mounted on the pointer spindle 11. In order to hold all members in their correct operative positions, the invention proposes an upper closure plate 15, as shown in FIGS. 3 and 7. This plate, also of molded plastics, is of trapezoidal shape and is provided with three pins depending from its undersurface and adapted for pressure-engagement in the holes of hubs 7, 8 and 9 of platform 3, which engagement is obviously effected after all internal members of the mechanism have been placed in their correct operative positions. The invention is further characterized by the fact that the connection between the free end of the Bourdon spring 5 and the toothed sector 13 is effected by a link 16, preferably in the form of an S-shaped steel wire, having an end inserted in an offset hole of the toothed sector 13 and the other end inserted in an eye member 5a which is integrally formed on the mobile end of said Bourdon tube, all with no need of auxiliary fixing means for preventing the disconnection of link 16 even in case of operation in an overturned position.

Figure 5:
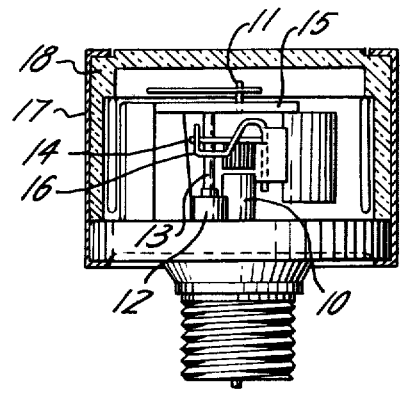
FIG. 5 is an axial sectional view on line B—B of FIG. 6.
Figure 6:
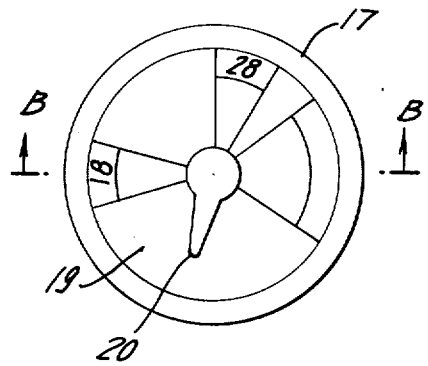
FIG. 6 is a plan view of a complete pressure-gage, with indicating pointer, dial and casing.

In order to enclose and protect said drive mechanism, the invention provides a tubular casing 17 whose upper end is folded over so as to form an inturned shoulder edge which fits in a cylindrical cup-shaped member 18. Said member 18 is molded of transparent plastics and on the inside thereof is peripherally engaged a graduated dial 19 above which the indicating pointer 20 is rotatably mounted due to its pressure-fit on spindle 11 (see FIGS. 5 and 6). On completion of the assembling operation, after mounting the casing 17 on the support body 1, the pressure-gage is calibrated by temporarily establishing the communication with a given pressure source and rotating the casing 17, together with the cup-shaped member 18 and dial 19 (while the body 1 is held stationary) until the pointer 20 collimates with the graduation on the dial corresponding to the value of said given pressure. On completion of this operation, the projecting edge of the casing 17 can be folded over against the back side of platform 3. In this operation, due to suitable cutouts in the lower periphery of platform 3, a firm tangential locking is ensured between platform 3 and casing 17, so that said casing 17 can be acted upon for screwing the gage in place, with no risk of altering inadvertently the established calibrated position.

Obviously, still within the basic principle of the invention, several modifications are possible, some of which will be illustrated hereinafter. The first embodiment, as mentioned in the introduction of this specification, proposes a pressure-gage with the molded plastics support body with embedded Bourdon tube, which has an extremely simplified drive mechanism enabling a useful and advantageous application on fire extinguishers or similar bottles containing compressed air or gas. More particularly, this embodiment concerns the gages designed simply to indicate whether the pressure is sufficient or insufficient, for example by means of a two-color dial or the like. Substantially, in this modification, as in the previous case, the Bourdon tubular spring — again through an S-shaped link — directly actuates a horizontal rocker arm rotatable on a vertical offset spindle and fixedly supporting thereon a sector-shaped member which is preferably composed of two differently-colored areas that, when the dial is in place, will be alternately exposed through a suitable slot in said dial, the arrangement being such to dispense with the conventional indicating pointer and graduated dial. This modified embodiment, practically, can dispense with the entire conventional gear-mechanism, which results in considerably lower costs so as to facilitate the manufacturing of "single-use" pressure-gages for fire-extinguishers and the like, which are used only once and are then thrown away.

Figure 10:
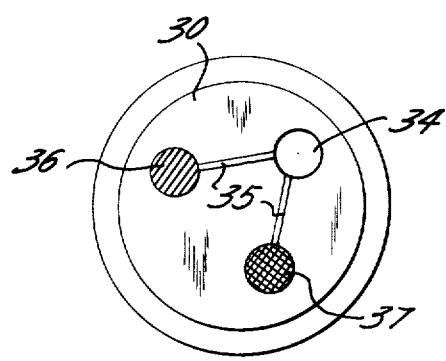
FIG. 10 is a plan view similar to FIG. 9, having the disc-shaped dial mounted thereon.
Figure 11:
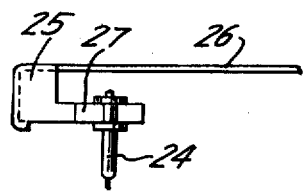
FIG. 11 is a side view of the rocker arm carrying the indicating sector.

As more clearly shown in FIGS. 8, 9, 10 and 11, this modified embodiment, while maintaining unchanged the support body 1 with an embedded Bourdon tubular spring 5 and attendant fittings, substantially contemplates that between the upper closure plate 22 and the support body 1 comprising to this purpose an offset hub 23 a rocker arm 25 is rotatably mounted on a vertical spindle 24 (FIG. 11). This rocker arm comprises a molded plastics L-shaped main body having fixed thereon an indicating sector 26 which is preferably composed of two differently-colored areas. Near its pivot axis, the rocker arm 25 has a hole 27 for connection with an end of an S-shaped steel-wire link 28 that directly connects the rocker-arm 25 to the movable end of said Bourdon tube 5. The upper closure plate 22 has at least two upright hubs 29 for supporting thereon a disc-shaped dial or screen 30 that upon mounting thereon the transparent closure member 31 will be pressure-locked between the latter and the ends of hubs 29 of plate 22, which hubs also act as limit stops for said indicating sector 26. Said member 31 is cup-shaped with upwardly-facing bottom and is held in place by an outer circular sleeve or casing 32. Where the edge of member 31 would contact the body 1 a sealing ring 33 of a suitable material is interposed. As shown in FIG. 10, said disc-shaped dial 30 is provided of an offset slot 34 through which the underlying indicating sector 26 can be observed, i.e. one of the differently-colored areas thereof can be exposed. According to a preferred embodiment of the invention, two indicating radially-diverging lines 35 extend from said slot 34 to a pair of small discs which are differently colored similarly to sector 26. Beside these discs, suitable inscriptions can explain which is the color representing the sufficient and insufficient pressure for the apparatus whereon the gage is mounted.

In the second modified embodiment, which will be described hereinafter, the application of the principle of the invention can be extended, as mentioned above, to the measurement of ambient pressure, as in the case of depth-gages in skin-diving activities or the like and in the industrial field. More particularly, this modification uses exactly the same Bourdon tube mechanism as above described, but the molded plastics support body is provided — instead of the depending threaded stem for communicating with the source of pressure to be controlled — with a sealed chamber filled with oil or other fluid which communicates with the inside of the Bourdon tube and which is closed by a diaphragm which renders the assembly responsive to the ambient pressure so that the latter can be read on the dial from the position of the pointer which is controlled by the drive mechanism, the latter being preferably sealingly enclosed in a suitable case that can be worn, for example, as a wrist-watch.

Figure 12A:
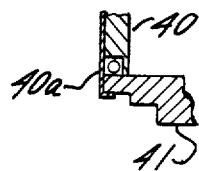
FIG. 12A is an axial sectional view showing, at an enlarged scale, the detail of a possible fluid-tight folded-seam connection between the support body and the transparent body housing the mechanism, the O-ring ensuring the fluid-tight connection being shown.
Figure 12:
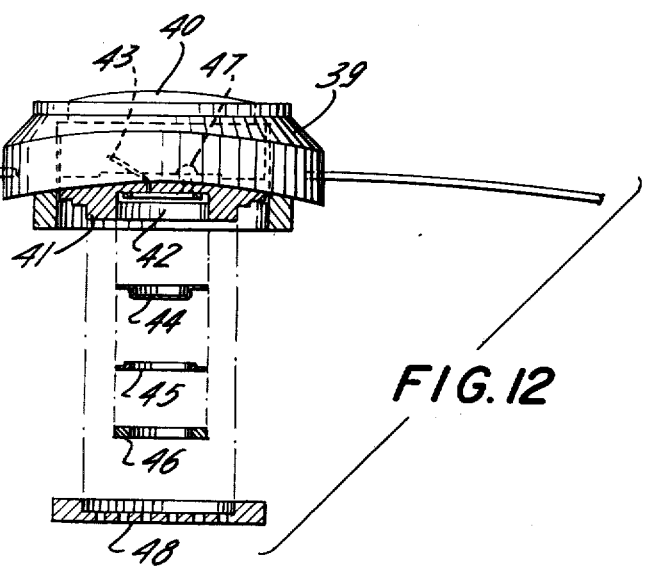
FIG. 12 is a side view and partly sectional view, with the lower portion in exploded view, of a wrist depth-gage having a Bourdon-type movement, according to the invention, in combination with a system according to a modified embodiment.

As clearly shown on FIGS. 12 and 12A, in this modification, the wrist depth-gage comprises a conventional strap 38 and a suitable casing 39 made of plastics or any other suitable material. Said casing is open at both sides and is formed with an internal cylindrical seat having an upper shoulder to enable the insertion from the lower side thereof of the whole sealingly closed assembly comprising said mehcanism with embedded Bourdon tube, cup-shaped transparent member 40, sealing O-ring 40a and support body 41 having, instead of the usual connecting threaded stem, a small circular chamber 42 communicating, through a diagonal hole 43, with the interior of the Bourdon tube (not further shown) which has been embedded during the molding operation of the support body 41 as in the preceding embodiments. The bottom of chamber 42 has a peripheral seat for a very flexible diaphragm 44 which is made of rubber or any other material and has a mating rim that is pressed against said seat by a ring 45 and an outwardly threaded nut 46 which is screwed into the correspondingly-threaded inner wall of chamber 42. As more clearly shown in FIG. 12, said diaphragm 44 preferably comprises a cup-shaped central portion with an outwardly-turned upper edge that is firmly engaged between said seat of chamber 42 and said ring 45 which is pressed by said nut 46, the latter having a concentrical hole to accomodate the cup-shaped portion of diaphragm 44 so that this diaphragm communicates with the outside pressure, the latter being of hydraulic, atmospheric or similar nature. The bottom of chamber 42 is formed with a small, threaded through-hole that can be closed by a suitable screw 47. Through this hole, the chamber 42 and the inside of the Bourdon tube can be filled with oil or other suitable fluid through which said diaphragm 44, in accordance with the outside pressure forces acting thereon, can transmit a certain movement to said Bourdon tube which in turn, as usual, will actuate the indicating pointer (not shown) which, after a proper calibration, will indicate on the dial, which is mounted on the upper portion of the casing, the pressure acting on the gage; obviously this pressure, in the case of the exemplified depth-gage, can be expressed directly in meters and fractions thereof.

Finally, to protect said diaphragm 44 against shocks and suitably lock the assembly forming the gage proper in the cylindrical seat of said casing, so as to prevent said assembly to slip out downwardly, the invention provides a bottom closure member in the form of a pressure-fitted circular cover 48 which is of grid-like configuration to afford communication between said diaphragm and the fluid whose pressure is to be measured.

The embodiments herein shown and described can be improved and modified still within the basic principles of the invention.

We claim:

1. A drive mechanism for pressure-gages, which comprises a support main body; a Bourdon tubular spring having a movable end and a fixed end embedded in said main body, and a small tube embedded in said main body connected at one end to said Bourdon tubular spring; said main body being formed, in a single molding operation, with an integral circular platform, at least one upright support projecting from said platform, and a depending axial stem for connection to a source of pressure, said stem having an axial conduit therein providing communication between the other end of said small tube and said source of pressure, said fixed end of said Bourdon tubular spring being embedded in a first said upright support and said small tube being embedded in said main body during said molding operation.

2. A drive mechanism according to claim 1, wherein at the fixed end of the Bourdon tube, said small tube is soldered or otherwise fixed to the Bourdon tubular spring and then embedded in said plastics support body during the molding operation.

3. A drive mechanism according to claim 1, wherein the movable end of said Bourdon tube has an integral lug which is curled in the form of an eye-member for engagement with a connecting link.

4. A drive mechanism according to claim 3, including a second upright support, a toothed sector supported on said second upright support, a spindle arranged to be actuated by said toothed sector, and an S-shaped connecting link connected at one end to said eye-member and at the other end to said toothed sector.

5. A drive mechanism according to claim 4, including further upright supports, the connecting link, the toothed sector and the spindle being held in their operating position only by means of a plastic closure plate, said closure plate having pins that can be pressure-inserted in corresponding axial bores in said further upright supports.

6. A drive mechanism according to claim 1, including a cup-shaped, transparent dial member and a tubular casing fitting over said cup-shaped member and locking the cup-shaped member to said main body, said tubular casing having a flange extending inwardly around the lower periphery thereof, said circular platform having cut-out portions on the underside thereof for engaging said flange and preventing movement of said tubular casing and cup-shaped member relative to said main body after calibration of the pressure gage.

7. A drive mechanism according to claim 1, including a second upright support, a small rocker-arm mounted on said second upright support, an indicating sector mounted on said rocker-arm and including at least two differently colored areas, an S-shaped connecting link connected at one end to said rocker-arm and at the other end to said fixed end of said Bourdon tube spring, and a screen disc over said indicating sector and having an offset slot through which the color of either area of the underlying indicating sector is exposed.

8. A drive mechanism according to claim 7, wherein said rocker-arm comprises a molded plastics L-shaped member provided with a pivot spindle, a hole for direct connection with said S-shaped connecting link and a seat for pressure-locking of said indicating sector.

9. A drive mechanism according to claim 7, wherein said screen disc has two small discs whose colors correspond to the colors of said indicating areas, and a pair of radially diverging lines connect said offset slot to said discs.

* * * * *